Patented July 24, 1951

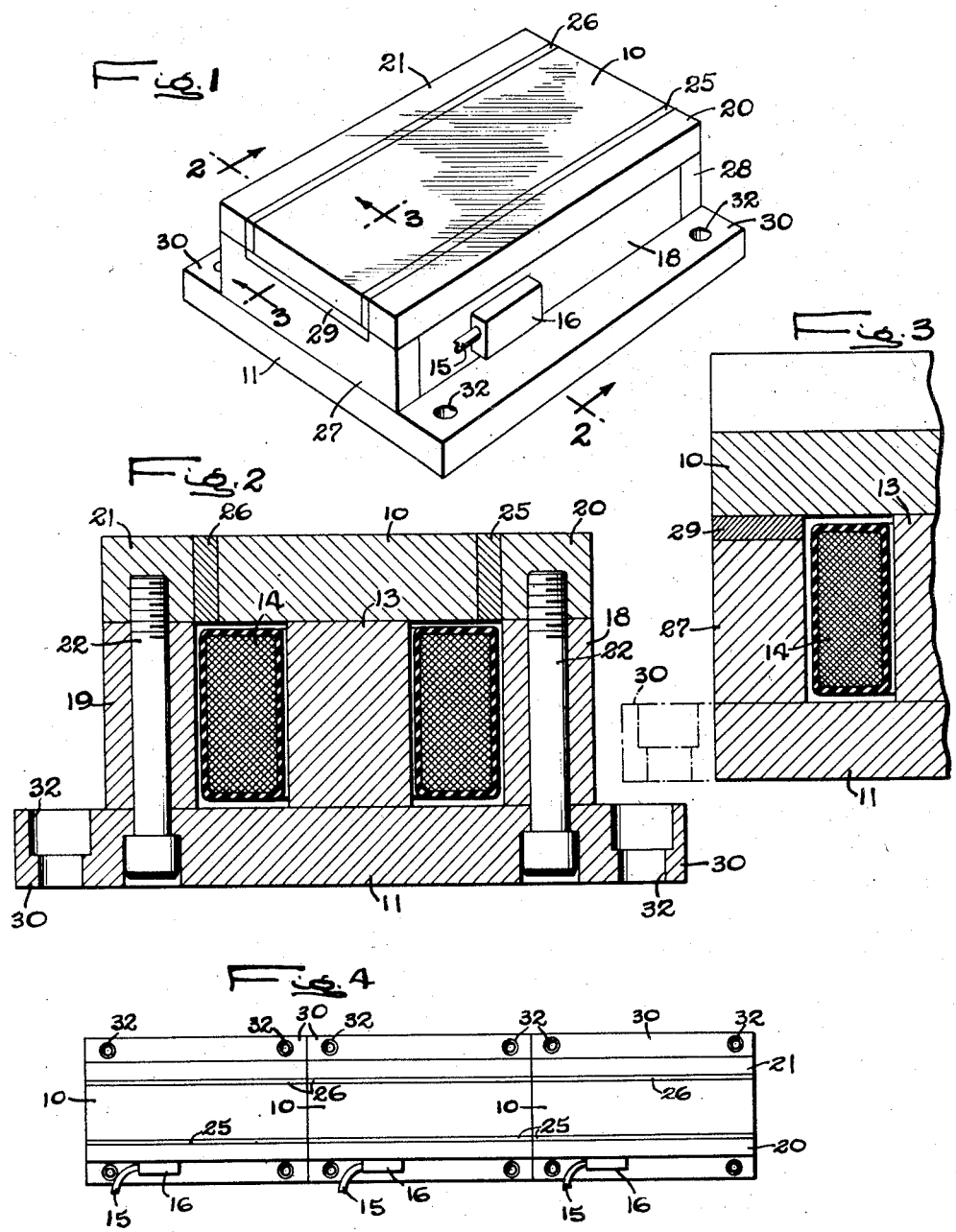

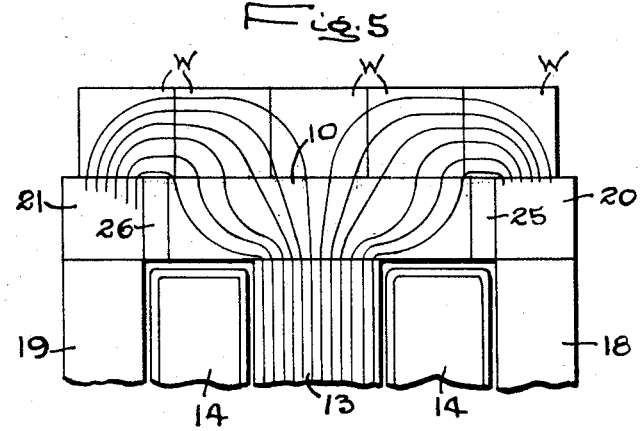
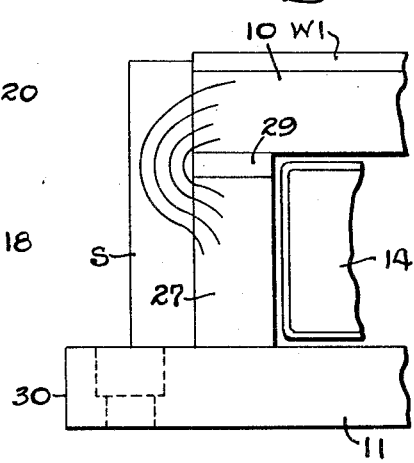
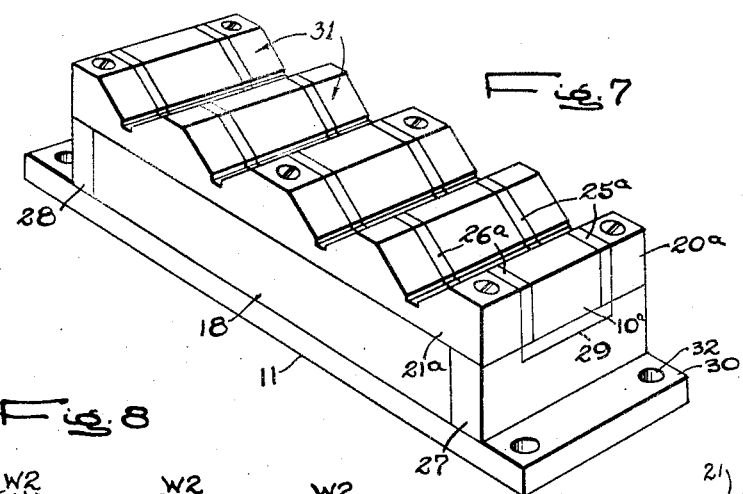
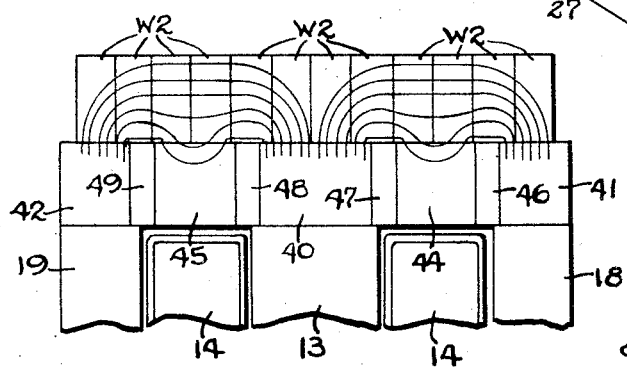
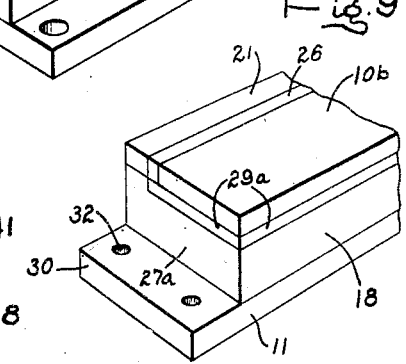

2,561,769

UNITED STATES PATENT OFFICE 2,561,769

MAGNETIC CHUCK

Axel Anderson, Rockford, Ill., assignor to Sundstrand Magnetic Products Co., Rockford, Ill., a corporation of Illinois Application June 29, 1948, Serial No. 35,883

4 Claims. (Cl. 175—367)

The present invention pertains generally to the chucking of workpieces and more particularly to chucks for magnetically holding workpieces composed of magnetic material to permit machining thereof.

A general object of the invention is to provide a novel magnetic chuck of highly versatile adaptability, of exceedingly simple construction and which permits of economical manufacture.

Another object is to provide a magnetic chuck which utilizing but a single core winding is effective to establish a plurality of magnetic circuits directed to the top surface of the chuck.

A more specific object lies in the provision of a magnetic chuck having pole pieces extending throughout the full length of the chuck and having a high reluctance gap included between the pole pieces to the end that the chuck is effective to hold workpieces throughout its full length and several chucks can be used conjointly to hold a series of small workpieces or one of extreme length.

Still another object is to provide a novel magnetic chuck effective to establish magnetic circuits in angularly related planes.

The objects of the invention thus generally set forth together with other and ancillary advantages are attained by the construction and arrangement shown by way of illustration in the accompanying drawings, in which:

Figure 1 is a perspective view of a magnetic chuck embodying the instant invention.

Fig. 2 is a transverse vertical section taken substantially in the plane of line 2—2 in Fig. 1.

Fig. 3 is a fragmentary longitudinal section taken substantially in the plane of line 3—3 in Fig. 1.

Fig. 4 is a plan view of three chucks disposed in end to end relation for use in holding a long workpiece or a series of small workpieces.

Fig. 5 is a fragmentary diagrammatic view indicating the paths of flux flow when several small workpieces are placed in side by side relation transversely of the chuck illustrated in Fig. 1.

Fig. 6 is a fragmentary diagrammatic view similar to Fig. 3 showing the utilization of a work stop in conjunction with the chuck to hold a thin workpiece.

Fig. 7 is a perspective view of a modified form of the chuck.

Fig. 8 is a view similar to Fig. 5 but showing still another modified form of the chuck.

Fig. 9 is a fragmentary perspective view of yet another modified form of the chuck.

While the invention is susceptible of various modifications and alternative constructions, there are shown in the drawings and will herein be described in detail the preferred embodiments, but it is to be understood that it is not thereby intended to limit the invention to the forms disclosed, but it is intended to cover all modifications and alternative constructions falling within the spirit and scope of the invention as expressed in the appended claims.

In accordance with the invention, the exemplary chuck through the use of a single core winding coacting with components of magnetic material permits the establishment of a plurality of magnetic circuits directed to its upper face for magnetically holding workpieces for machining thereof and simultaneously permits the establishment of other magnetic circuits angularly related to those directed to the upper chuck face. As illustrated in Figs. 1 through 6, inclusive, of the drawings the chuck comprises a pair of rectangular plates 10 and 11 composed of magnetic material which are disposed in parallel relationship and are rigidly secured to a central plate 13 which is also of magnetic material. About the central plate 13 and between the upper and base plates 10 and 11 is a simple winding 14. The latter is adapted to be connected to a source of electric current by means of a two conductor cord 15 and a terminal block 16 whereby the chuck can be energized. It will be apparent that upon energization of the winding 14 the upper and lower plates 10 and 11 become magnetic poles of opposite polarity.

To establish a plurality of magnetic circuits directed to the top surface of the chuck magnetic poles of the polarity opposite to that of the upper plate 10 are provided in such surface. To this end, side plates 18 and 19 and pole pieces 20 and 21 rigid with the plates 18 and 19 respectively, are secured to the base plate 11 as by means of cap screws 22. The side plates and the pole pieces are of magnetic material and the latter extend throughout the full length of the chuck in the top surface thereof. Thus upon energization of the winding 14, through the provision of a low reluctance flux flow path, the pole pieces 20 and 21 assume the polarity of the lower plate 11 which is opposite to that of the plate 10.

The pole pieces 20 and 21 and the upper plate 10 are spaced apart by means of inserts 25 and 26 of non-magnetic material thus providing high reluctance gaps between the pole pieces and the upper plate which insure inclusion of workpieces of magnetic material in the magnetic circuits established upon energization of the chuck. By way of example, several workpieces W disposed transversely of the top of the instant chuck are shown in Fig. 5 wherein the paths of flux in the magnetic circuits are indicated in broken lines. Since the pole pieces 20 and 21, the inserts 25 and 26 and the upper plate 10 extend throughout the full length of the chuck, the chuck is fully effective throughout all of its length to hold one or several workpieces placed anywhere upon it, so long as the workpieces are of magnetic material and are arranged so that some portion of the work bridges one of the gaps defined by the inserts. Additionally, such construction permits the use of several chucks in end to end relation, as illustrated in Fig. 4, for holding long work including a single piece or many small pieces placed side by side, the work being held firmly throughout its entire length.

Provision is made to establish magnetic circuits simultaneously with and angularly related to those directed to the upper surface of the chuck. With the instant chuck such magnetic circuits are directed to the ends of the chuck and thus are particularly useful to hold a work stop on the end of the chuck in order to prevent longitudinal shifting of an extremely thin workpiece disposed on the top surface of the chuck and also to hold workpieces on the end of the chuck to permit squaring thereof. For this purpose end walls 27 and 28 are provided which extend between the lower plate 11, the side plates 18 and 19 and the pole pieces 20 and 21 and in contact with each. The end walls are of magnetic material and consequently assume the polarity of the components with which they are in contact upon energization of the winding 14. Thus magnetic poles of opposite polarity are provided in the ends of the chuck, viz. the end walls 27 and 28 and the outer ends of the upper plate 10. High reluctance gaps between these poles are provided by inserts 29 of non-magnetic material. Upon reference to Fig. 6 it will be seen that a work stop S, for example, placed against the end of the chuck and bridging the insert 29 is included in the magnetic circuit established between the end wall 27 and the upper plate 10, the flux flow paths being indicated by broken lines, and the stop S is firmly held in such position to prevent shifting of a thin workpiece W1 placed on the top of the chuck and abutting the stop.

It is to be noted especially that the construction as hereinbefore set forth has the additional advantage of providing complete protection for the core winding 14. The top and bottom of the winding are protected by the upper and lower plates 10 and 11 respectively, the sides of the winding are protected by the side plates 18 and 19 respectively and the ends of the winding are protected by the end walls 27 and 28.

Provision is made to permit the chuck to be mechanically secured in place on the work table of a machine tool and to this end the base is provided with outwardly extending flanges 30 having holes 32 therethrough adjacent the ends of each for the reception of T-bolts or the like. In Figs. 1 and 2 the flanges 30 are shown extended laterally from the base 11, however, it will be readily apparent to one skilled in the art that similar flanges can be provided on the ends of the base 11 as is indicated in dotted lines in Fig. 3 and on the modified form of chuck illustrated in Fig. 7.

In the form of the chuck shown in Fig. 7 the upper chuck surface has been modified to provide a series of parallel, transversely disposed and laterally spaced V-grooves 31 for the accommodation of round bar stock. This form of chuck is constructed in substantially the same manner as that illustrated in the preceding figures and includes the lower plate or base 11, the side plates 18 and 19, the ends walls 27 and 28, and the insert 29. The grooves 31 are formed in an upper plate 10a, inserts 25a and 26a and the pole pieces 20a and 21a which correspond to the similarly disposed components 10, 25, 26, 20 and 21 of the form of the chuck illustrated in the preceding figures, and thus the operation of the chuck is substantially the same. It will readily be apparent to one skilled in the art that while short stock may be securely held using a single chuck of this type, several chucks may be used conjointly in spaced relation to support long lengths of round stock. An additional advantage flowing from the instant construction is that in passing along workpieces held in the grooves 31 cutters move first over a pole of one polarity and then over one of opposite polarity. Thus there is a neutralizing of any magnetization that might have been produced in the cutters. This tends to keep the cutters free of chips.

In Fig. 8 of the drawings there is illustrated still another modified form of chuck embodying the instant invention. In this form there is provided an even larger number of magnetic poles for the establishment of a larger number of magnetic circuits directed toward the upper surface of the chuck. This form is particularly useful in the chucking of a number of small workpieces W2 in side by side relation across the upper chuck surface. As shown, the upper chuck surface comprises a central plate 40, outer pole pieces 41 and 42 and intermediate bars 44 and 45 each of which are separated by high reluctance gaps defined by inserts 46, 47, 48 and 49. The central plate 40 is secured to the plate 13 and the outer pole pieces 41 and 42 are secured to the side plates 18 and 19. Thus they become magnetic poles of opposite polarity upon energization of the winding 14. The intermediate bars 44 and 45 are not directly magnetized.

Upon energization of the winding 14 there will be a flow of flux in a path including the outer pole piece 41 the intermediate bar 44 and the central plate 40 and through the workpieces W2 disposed thereover. Correspondingly there will also be a flux flow path through the outer pole piece 42, the intermediate bar 45, and the central plate 40 to firmly hold the workpieces on top of these elements. Such construction, therefore, minimizes danger of longitudinal shifting of intermediate workpieces, that is, those not bridging one of the high reluctance gaps or immediately adjacent thereto, and insures that such pieces are firmly held on the upper surface of the chuck.

In Fig. 9 a modified form of the chuck is illustrated wherein provision is made to permit the simultaneous establishment of magnetic circuits in three angularly related planes. This form of the chuck includes the elongated base 11, the side plate 18, the pole piece 21 and the insert 26 together with central plate 13, the side plate 19 and the winding 14 (not shown in this figure) which are identical with the corresponding components of the chuck form illustrated in Figs. 1 to 6 inclusive. The upper plate, the end walls and the end inserts are modified and a side insert has been added. Thus, rigid with the central plate 13 is an upper plate 10b of magnetizable material which abuts the insert 26 and extends throughout the full length of the chuck and across the remainder of its width. End walls 27a also of magnetizable material are provided which extend between the lower plate 11, the side plates 18 and 19 and pole piece 21 in contact with each. The upper plate 10b is separated from the end walls 27a and the side plate 18 by an insert 29a disposed therebetween and thus defining high reluctance gaps between these components. The insert 29a, as shown, is of substantially U-shape, the leg portions of which are disposed between the upper plate 10b and the end walls 27a, and the elongated bight portion of which is disposed between the upper plate 10b and the side plate 18. From the foregoing therefore it can be seen that upon energization of the winding 14, there are simultaneously established magnetic circuits directed to the ends of the chuck between the upper plate 10b and the end walls 27a about the insert 29a, directed to the side of the chuck between the upper plate 10b and the side plate 18 about the insert 29a and directed to the top of the chuck between the upper plate 10b and the pole piece 21 about the insert 26.

I claim as my invention:

1. A magnetic chuck comprising, in combination, upper and lower face plates of magnetic material, a central plate of magnetic material secured to and between said face plates, side plates and pole pieces of magnetic material rigidly secured to the lower face plate, an end wall of magnetic material extending between the lower face plate, the pole pieces and the side plates, inserts of non-magnetic material disposed between said upper face plate and said pole pieces and between said upper face plate and said end wall, and a winding disposed about said central plate, said upper face plate and said pole pieces extending throughout the full length of the chuck and becoming magnetic poles of opposite polarity upon energization of said winding and said end wall becoming a magnetic pole of a polarity like that of said pole pieces.

2. A magnetic chuck comprising, in combination, upper and lower face plates of magnetic material, a central plate of magnetic material secured to and between said face plates, side plates and pole pieces of magnetic material rigidly secured to the lower face plate, end walls of magnetic material extending between the lower face plate, the pole pieces and the side plates, inserts of non-magnetic material disposed between said upper plate and said pole pieces and between said upper plate and said end walls, and a winding disposed about said central plate and adapted to be connected to a source of electric current, said upper face plate and said pole pieces extending throughout the full length of the chuck and becoming magnetic poles of opposite polarity upon energization of said winding effective to establish magnetic circuits directed to the top surface of the chuck and said end walls simultaneously becoming magnetic poles of a polarity opposite that of said upper face plate effective to establish magnetic circuits directed to the end surfaces of the chuck.

3. A magnetic chuck comprising, in combination, spaced upper and lower face plates of magnetic material, a central plate of magnetic material secured between the centers of said face plates, side plates and pole pieces of magnetic material rigidly secured to the lower face plate and extending upwardly therefrom, end walls of magnetic material extending between the lower face plate, the pole pieces and the side plates, inserts of non-magnetic material disposed between said upper plate and said pole pieces and between said upper plate and said end walls, the upper plate, pole pieces, end plates and inserts forming together a surface for the reception of work pieces, and a winding disposed about said central plate, said upper face plate and said pole pieces extending throughout the full length of the chuck and becoming magnetic poles of opposite polarity upon energization of said winding and said end wall becoming a magnetic pole of a polarity like that of said pole pieces.

4. A magnetic chuck comprising, in combination, spaced upper and lower face plates of magnetic material, a central plate of magnetic material secured between the centers of said face plates, side plates and pole pieces of magnetic material rigidly secured to the lower face plate and extending upwardly therefrom, end walls of magnetic material extending between the lower face plate, the pole pieces and the side plates, inserts of non-magnetic material disposed between said upper plate and said pole pieces and between said upper plate and said end walls, the upper plate, pole pieces, end plates and inserts forming together a plane surface for the reception of work pieces, and a winding disposed about said central plate and adapted to be connected to a source of electric current, said upper face plate and said pole pieces extending throughout the full length of the chuck and becoming magnetic poles of opposite polarity upon energization of said winding effective to establish magnetic circuits directed to the top surface of the chuck and said end walls simultaneously becoming magnetic poles of a polarity opposite that of said upper face plate effective to establish magnetic circuits directed to the end surfaces of the chuck.

AXEL ANDERSON.

REFERENCES CITED

The following references are of record in the file of this patent:

UNITED STATES PATENTS

| Number | Name | Date |
|---|---|---|
| 564,296 | Walker | July 21, 1896 |
| 1,222,052 | Walker | Apr. 10, 1917 |
| 1,548,793 | Bing | Aug. 4, 1925 |
| 1,673,719 | Tracy | July 12, 1928 |
| 2,347,170 | Brown | Apr. 25, 1944 |

FOREIGN PATENTS

| Number | Country | Date |
|---|---|---|
| 308,914 | Germany | Jan. 3, 1917 |
| 122,239 | Great Britain | Jan. 14, 1919 |